United States Patent
McLeod et al.

(10) Patent No.: US 6,742,475 B1
(45) Date of Patent: Jun. 1, 2004

(54) VARIABLE SHUT OFF TEAT CUP LINER

(75) Inventors: Rick McLeod, Kansas City, MO (US); James C. Fredericks, Kansas City, MO (US)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/321,387

(22) Filed: Dec. 18, 2002

(51) Int. Cl.$^7$ .................................................. A01J 5/04
(52) U.S. Cl. ................................ 119/14.49; 119/14.47; 119/14.54
(58) Field of Search ........................... 119/14.47, 14.48, 119/14.49, 14.5, 14.51, 14.52, 14.53, 14.54, 14.55

(56) References Cited

U.S. PATENT DOCUMENTS

| | | | | | |
|---|---|---|---|---|---|
| 2,079,435 | A | * | 5/1937 | Dinesen | ................... 119/14.52 |
| 3,079,891 | A | * | 3/1963 | Miller | ........................ 119/14.5 |
| 3,999,516 | A | * | 12/1976 | Shulick | ..................... 119/14.1 |
| 4,324,201 | A | * | 4/1982 | Larson | ..................... 119/14.51 |
| 4,441,454 | A | * | 4/1984 | Happel et al. | ........... 119/14.36 |
| 4,745,881 | A | * | 5/1988 | Larson | ..................... 119/14.51 |
| 4,869,205 | A | * | 9/1989 | Larson | ..................... 119/14.51 |
| 5,493,995 | A | | 2/1996 | Chowdhury | |
| 6,039,001 | A | * | 3/2000 | Sanford | ................... 119/14.47 |
| 6,142,098 | A | * | 11/2000 | van den Berg | .......... 119/14.51 |
| 6,397,893 | B1 | * | 6/2002 | Johannesson | ............... 138/115 |

FOREIGN PATENT DOCUMENTS

| DE | 2800733 A1 | * | 9/1978 | ............. A01J/5/06 |
|---|---|---|---|---|
| GB | 2145915 A | * | 4/1985 | ............. A01J/5/04 |

* cited by examiner

Primary Examiner—Charles T. Jordan
Assistant Examiner—John W. Zerr
(74) Attorney, Agent, or Firm—Hovey Williams LLP

(57) ABSTRACT

A variable shut off teat cup liner has a mouthpiece, a barrel and a short milk tube adapted for mounting onto milking claw. The short milk tube includes a segment for engagement with an edge of a claw nipple defining an opening, the segment being intended for bending over the opening to substantially close it to passage of vacuum-drawn air therethrough when the teat cup liner is in a non-milking generally downwardly bending position. The segment has circumferentially extending grooves and longitudinally extending grooves which form lugs which provide improved cut resistance. The circumferentially extending grooves have different axial spacing whereby the amount of overlap of the short milk tube over the nipple may be varied to provide the proper amount of bending.

14 Claims, 3 Drawing Sheets

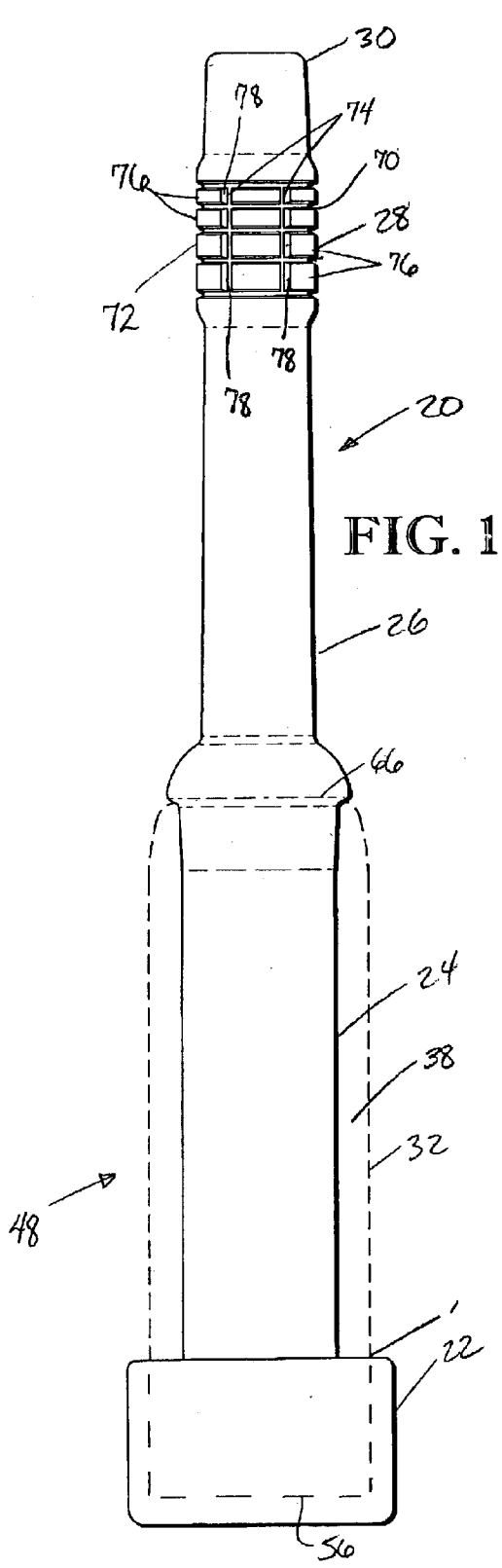
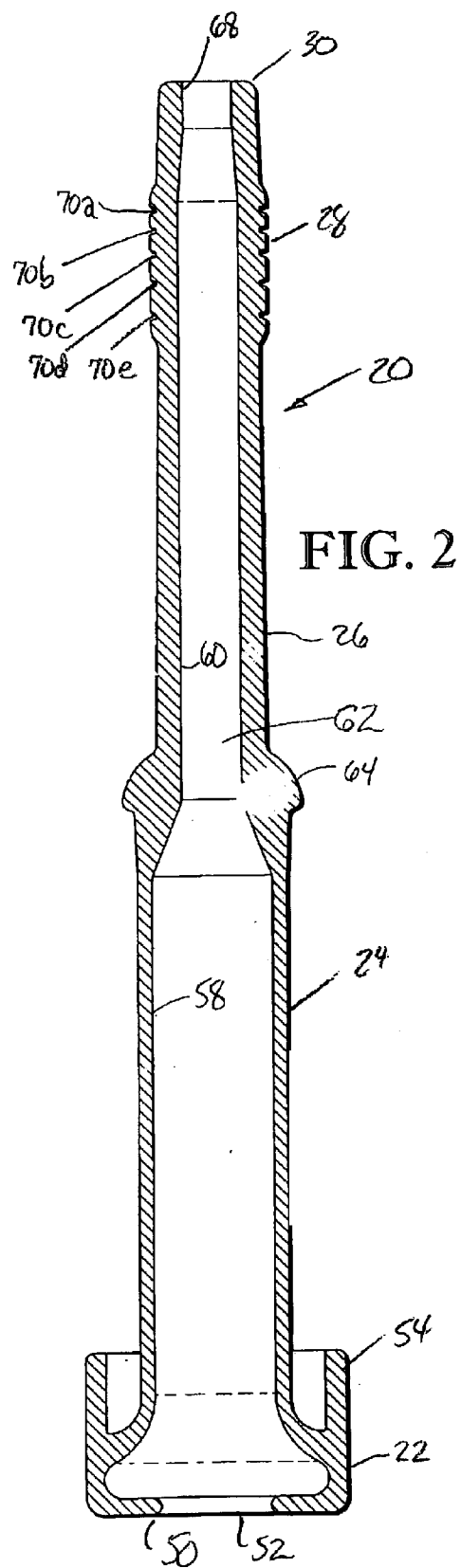
FIG. 1
FIG. 2

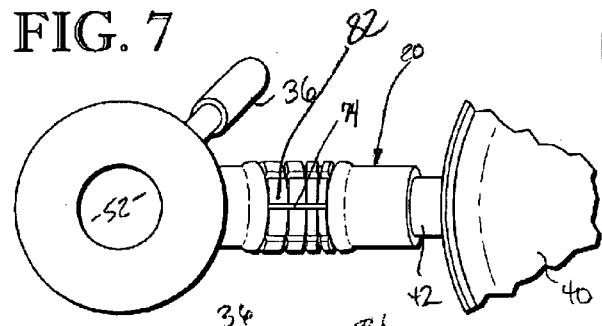
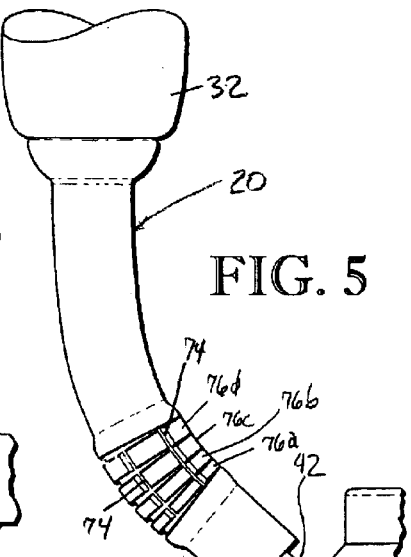
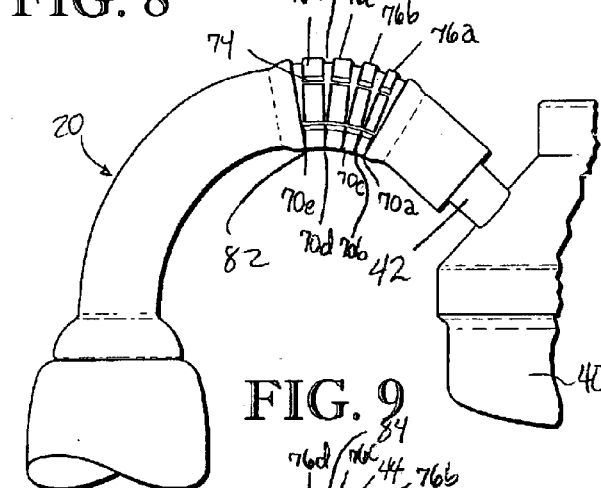
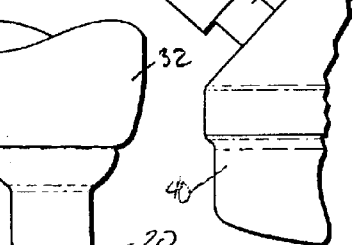
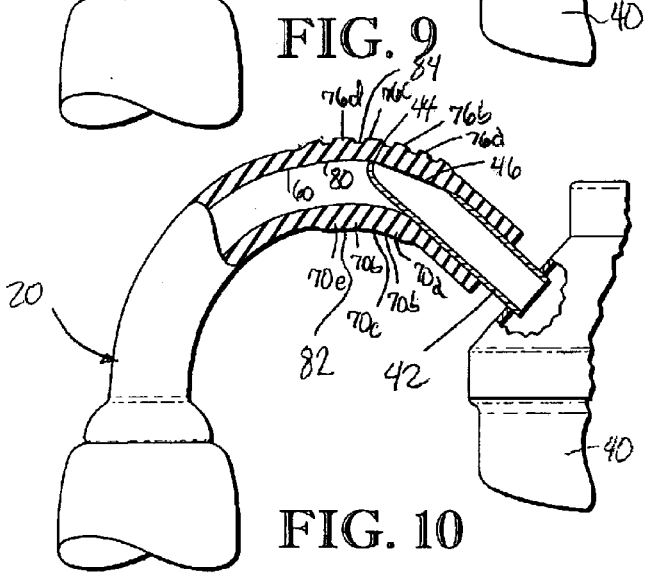
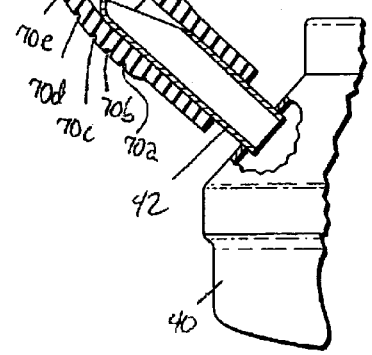
FIG. 7
FIG. 5
FIG. 8
FIG. 6
FIG. 9
FIG. 10

VARIABLE SHUT OFF TEAT CUP LINER

BACKGROUND OF THE INVENTION

1. Field of the Invention

The present invention is concerned with a teat cup liner, also known as an inflation, for a teat cup which is designed to permit mounting of the liner on a milking claw to provide resistance to cuts and variable amenability to closure of the opening of a corresponding nipple in the milking claw when the liner is in a hanging, non-milking position. By resisting cuts and providing such closure in the non-milking position, the liner reduces the flow of vacuum-drawn air through the channel of the liner and thereby saves energy by reducing the demand on the vacuum pump.

2. Description of the Prior Art

In typical dairy applications, conventional automatic milking machines utilize a plurality of teat cup assemblies connected to a common milk claw. Each of the teat cup assemblies include a hollow outer shell or cup attached to a pulsation line which typically alternates between a vacuum and atmospheric pressure. An inflation or teat cup liner is provided within the teat cup and extends axially along the length thereof. The liner includes a mouthpiece which extends from one end of the teat cup to seal one end of the cup and to receive a teat of an animal to be milked therein, a barrel which surrounds at least a portion of the teat and flexes according to the pulsating pressure, and a short milk tube which extends from and seals the other end of the teat cup for connection to the milking claw. A constant vacuum is drawn through the claw and the liner during milking to extract milk from the animal. Thus, the interior milk and vacuum conveying channel within the liner is maintained at constant sub-atmospheric conditions. A vacuum pump is operable connected to the milking claw by, inter alia, a long milk tube, the vacuum pump being connected to a source of power to create the necessary vacuum for milk extraction.

During milking, the annular region between the cup and the liner is subjected to alternating subatmospheric pressure and a higher, typically atmospheric pressure, while the mouth of the liner is positioned in sealing engagement with the teat. The barrel wall alternately flexes inwardly toward the teat in the teat-receiving region of the barrel and relaxes to a generally straightened position during respective application of elevated (atmospheric) and subatmospheric pressure. This alternating pressure in the annular region effectively causes the barrel wall to massage the teat and thereby promote the extraction of milk.

Once the milk is effectively extracted from one or more of the teats, many automatic milking machines include an automatic take-off feature. The teatcup assembly is removed from the teat of the animal, with a beneficial effect of reducing irritation caused by vacuum and pulsation longer than is necessary to extract the milk. Once the teat cup assembly is removed from the teat, the mouth of the liner is no longer sealed around the teat and air rapidly rushes in. In consequence, a greater demand is placed on the vacuum pump in order to maintain a desired vacuum in the milking system. As multiple claws are commonly connected to a single vacuum pump, other teatcup assemblies may still require vacuum for milking, or even other assemblies attached to the same milking claw which are still connected to another teat of the same animal.

One problem thus encountered during milking is excessive loads placed on the vacuum pump when a teatcup is detached from a teat. As noted in U.S. Pat. No. 5,493,995, the disclosure of which is incorporated herein by reference, one solution provided to control the demands on the vacuum pump is allowing the teatcup assembly to drape over the opening in the short milk nipple of the claw. This practice substantially reduces the flow of air through the passage drawn by the vacuum pump and thereby reduces vacuum demand. However, there are several problems associated with this system. One is that chafing and cuts rapidly occur where the liner engages the short milk nipple. Once a liner is cut, it must be discarded as the leakage of air through the liner impedes proper milking. This increases costs to the dairyman both in terms of material and in labor to inspect and frequently replace liners. Another problem is that not all teat cups are the same, varying in size and weight. As a consequence, making the liner wall of the proper thickness to shut off for one teat cup may not work for a lighter teat cup which has insufficient weight to cause proper bending of the liner. A liner with one wall thickness may be too thick may prevent shut-off, while making the liner wall too thin may cut too rapidly. Furthermore, changes in environmental conditions during the year make the liner more flexible in warmer weather while more rigid in colder weather.

There has thus developed a need for an improved liner which addresses these problems while still reducing energy consumption by the vacuum pump and resisting cutting from the short milk nipple of the claw.

SUMMARY OF THE INVENTION

These and other problems have largely been addressed by the variable shut off teat cup liner of the present invention. That is to say, the liner provides a degree of adjustability in regard to the flexibility of the liner in a segment of the short milk tube intended for mounting in engagement with the nipple, while providing improved cut resistance in the segment. The liner is particularly useful with milking claws having short milk nipples with angled edges so that the wall of the liner lays across the nipple opening, with improved cut resistance. A single liner may be used by the dairyman with different claws and different environmental conditions by permitting the dairyman to vary the placement of the liner on the nipple and thus change the relative flexibility in the segment intended for bending over the opening of the nipple of the milking claw.

The liner hereof includes a mouthpiece, a barrel and a short milk tube as is conventional. However, the short milk tube includes a segment including a plurality of grooves to promote bending of the liner in this area when the teat cup liner is detached from the animal's teat. While the segment is sufficiently stiff to slightly bend but avoid folding by the weight of the liner alone, when the teat cup is attached, it bends sufficiently to drape over the opening of the nipple of the claw when properly mounted. The segment most preferably includes both a plurality of circumscribing grooves and a plurality of longitudinal grooves in the outer surface of the liner wall. The circumscribing grooves are axially spaced at different intervals whereby lugs of different widths are a part of the segment. The resulting larger lugs are preferably located more proximate the mouthpiece of the liner, while the relatively smaller lugs are thereby positioned more proximate the nipple receiving end of the liner. The resulting construction of the segment permits the user to effectively adjust the tendency of the segment to bend according to how far the short milk tube is installed over the nipple. By installing the liner on the nipple of the milk claw to a greater degree, the short milk tube tends to bend at that portion of the segment having the larger lugs and thus is relatively less flexible. If the liner is installed such that a lesser amount of the short milk tube overlies the nipple, then the short milk tube tends to bend in the region of the small lugs where the circumscribing grooves are closer together and thus is more flexible. Thus, the degree of flexibility can be readily adjusted by the dairyman by increasing or decreasing the amount of overlap of the short milk tube over the nipple. Moreover, the longitudinal grooves provide flexibility but tend to cause the lugs on the upper side of the segment to close together when the liner bends in the area of the segment. Thus, the wall thickness of the liner at the lugs having an increased thickness relative to the wall thickness of the liner at the grooves, the lugs of the liner where the greatest bending occurs move toward each other to thereby resist cuts extending through the liner along a possibly sharp edge of the nipple.

These and other advantages of the present invention will be readily apparent to those skilled in the art with reference to the drawing and description which follows.

BRIEF DESCRIPTION OF THE DRAWINGS

FIG. 1 is a side elevational view of the variable shut off teat cup liner of the present invention with the dashed lines showing a teat cup which receives the liner therethrough;

FIG. 2 is a vertical cross-sectional view of the liner of FIG. 1, showing the wall thickness of the liner and the depth of the circumscribing grooves in the segment of the short milk tube intended for contacting the nipple;

FIG. 5 is a fragmentary side elevational view showing a teat cup assembly in the first upright position of FIG. 3 to show the bending of the short milk tube in the segment of the short milk tube;

FIG. 6 is a fragmentary side elevational view similar to FIG. 5 but showing a portion of the short milk tube in cross section to illustrate the position of the nipple of the claw when the teat cup assembly is in the first upright position;

FIG. 7 is a fragmentary bottom view showing the teat cup assembly in the second position to illustrate the closure of the circumscribing grooves between the differently sized lugs along the inside curvature as the short milk tube bends downwardly;

FIG. 8 is a fragmentary top plan view showing the teat cup assembly in the second position as in FIG. 7 showing the opening of the circumscribing grooves on the top or outside curvature of the bended segment of the short milk tube;

FIG. 9 is a fragmentary side elevational view showing the teat cup assembly in the second position as in FIG. 7, showing the circumscribing grooves opening on the top side and closing on the bottom side of the segment; and FIG. 10 is a fragmentary side elevational view in partial section of the teat cup assembly in the orientation of FIG. 7 showing the engagement of the edge of the nipple with the inside of the liner wall in the segment of the short milk tube.

DESCRIPTION OF THE PREFERRED EMBODIMENT

Figures 3, 4:
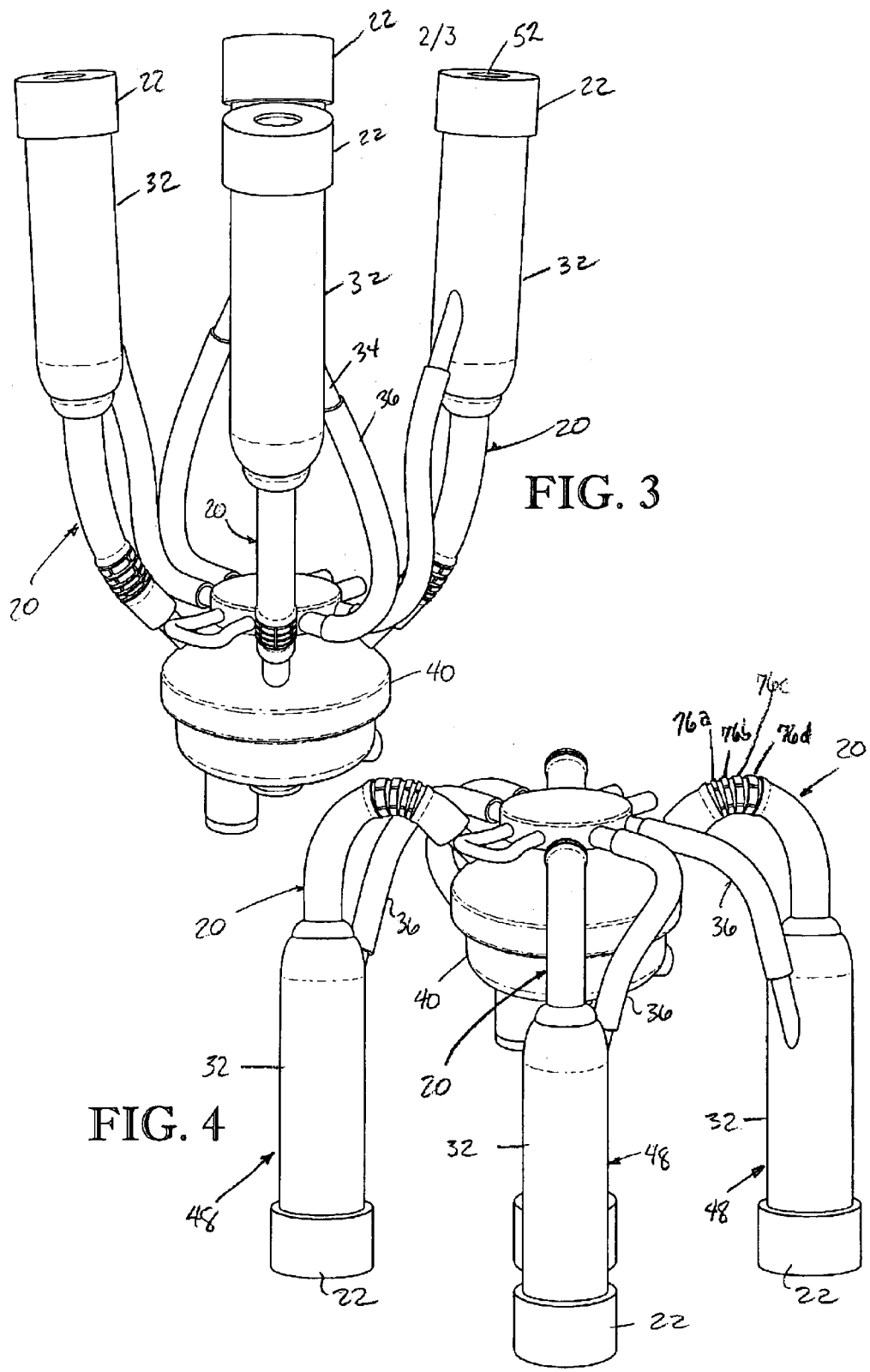
FIG. 3 is a perspective view showing four teat cup assemblies mounted to a milking claw with the assemblies in a first upright position where an animal's teats may be received into the liners for milking.
FIG. 4 is a perspective view similar to FIG. 3 but showing the teat cup assemblies in a second downwardly oriented position typically occupied when the assemblies are detached from the animal's teats after milking.

Referring now to the drawing, a teat cup liner 20 in accordance with the present invention includes a mouthpiece 22, a barrel 24 and a short milk tube 26, the short milk tube including a segment 28 constructed for engagement with an edge of a milking claw nipple and a nipple-receiving end 30. The liner 20 is elastic and preferably molded of synthetic rubber and is intended for insertion into a teat cup 32. The teat cup has a pulsation line connector 34 which fluidically communicates with a source of vacuum such as a vacuum pump (not shown) by a pulsation tube 36. An annular space 38 is provided between the barrel 24 and the teat cup 32 whereby alternating pressure, such as between a vacuum and atmospheric pressure, is created in the annular space 38 during milking. The liner 20 is connected to a milking claw 40 which includes at least one and preferably a plurality of nipples 42 by sliding the nipple-receiving end 30 over the nipple 42. The nipple may have a straight-across, circular opening as shown in U.S. Pat. No. 5,493,995, but the present invention is more particularly adapted for use with a nipple 42 having a beveled edge 44 with an upwardly-oriented opening 46 when the claw is in a normal milking position beneath the udder of the animal as illustrated by the position shown in FIGS. 3, 4, 6 and 10. The liner 20 and the teat cup 32 together form a teat cup assembly 48.

In greater detail, the liner mouthpiece 22 includes a circumferentially inwardly extending lip 50 which forms a mouth 52 which is sized to receive a dairy animal's teat therein and to seal around the teat during milking, but to also permit the teat cup assembly 48 to fall or be removed from the teat manually or by a take-off device once milking is completed. The mouthpiece 22 includes a skirt 54 which extends over a relative large opening 56 of the teat cup 32 to seal the annular space 38. The liner 20 has a wall 58 with an interior surface 60 which defines a channel 62 to permit vacuum from the vacuum pump communicated through the claw and the channel 62 to extract milk from the teat and to permit the extracted milk to be pulled by the vacuum through the channel 62 and into the claw. The thickness of the wall in the region of the barrel 24 is preferably reduced relative to the thickness in the short milk tube 26 to permit the barrel to flex according to the pulsating pressure in the annular space 38. A shoulder 64 is positioned at the normally lowermost end of the barrel 26 in order to seal around the teat cup 32. The short milk tube 26 passes through a hole 66 in the teat cup 32 opposite the large opening 56. The nipple-receiving end 30 is sized to seal around the nipple 42 of the claw 40 and has an open end 68 to permit passage over the nipple 42.

The segment 28 adapted for engagement with the edge of the nipple is located on the short milk tube 26 between the skirt 54 and the nipple-receiving end 30. As seen in the drawings, the wall 58 is provided with a plurality of axially spaced circumscribing grooves 70 in the outer surface 72 of the segment 28 as well as a plurality of circumferentially spaced longitudinal grooves 74 in the outer surface 72. The longitudinal grooves are preferably evenly circumferentially spaced, for example at about 60 degrees for six grooves 74, and extend between a first proximate circumscribing groove 70a more proximate the nipple-receiving end 28 and a remote circumscribing groove 70e relatively remote from the nipple-receiving end 28. Intermediate circumscribing grooves 70b, 70c and 70d are located between grooves 70a and 70e but with progressively increasing spacing therebetween from the proximate circumscribing groove 70a to the remote circumscribing groove 70e. For example, the groove-to-groove spacing between adjacent circumscribing grooves may progressively increase from about 3 arid ½ mm between grooves 70a and 70b, to about 4 and ½ mm between grooves 70b and 70c, to about 5 and ½ mm between grooves 70c and 70d, and about 6 mm between grooves 70d and 70e. The circumscribing grooves 70 and the longitudinal grooves 74 are preferably angled with a flat bottom surface in the groove 70 and have a depth of about 1 and ¼ mm.

The grooves 70 and 74 together define a plurality of lugs 76. The lugs 76 thus increase the thickness of the wall 58 corresponding to the depth of the grooves, for example about 1 and ¼ mm. Similarly, the length of the lugs 76 progressively increases corresponding to the groove-to-groove spacing between the grooves 70, such that lugs 76a proximate the nipple-receiving end are narrower than lugs 76b, which are in turn narrower than lugs 76c, with lugs 76c narrower than lugs 76d as shown in the drawings. Each of the lugs 76a are preferably, though not necessarily, of substantially the same dimensions, with each of the lugs 76b similarly of the same size relatively to one another but larger than lugs 76a, and so on with respect to lugs 76c relatively to lugs 76b and lugs 76d relative to lugs 76c. The grooves 70 and 74 are provided such that the lugs 76 have side surfaces 78 which are obliquely angled relative to the bottom surface of the grooves and the top surface of the lugs 76. The side surfaces 78 of the lugs are most preferably angled about 18 degrees from a perpendicular line to the bottom surface of the grooves and the top surface of the lugs, so that two opposing side surfaces 78 of adjacent lugs 76 diverge at about 36 degrees relative to one another.

In use, the liner 20 is mounted on the teat cup 32 and the nipple-receiving end of the liner 20 is installed over the nipple 42 while the pulsation tube 36 is connected onto the pulsation line connector 34 of the teat cup 32. Depending on the environmental conditions and the weight of the teat cup 32, the short milk tube 26 is positioned on the nipple 42 so that the liner properly hangs from the nipple 42 as shown in FIGS. 9 and 10 when not connected to the animal's teat. When the liner 20 is properly mounted, the nipple-receiving end 30 properly seals around the nipple 42 and holds the liner 20 in place, and the upper portion 80 interior surface 60 of the liner wall 58 in the segment 28 lays across the opening 46 when the segment 28 bends under the influence of gravity when the teat cup assembly is in a second, non-milking hanging position as shown in FIG. 4 but not when the teat cup assembly is in a first, milking orientation as shown by FIG. 3. By such positioning across the opening, during bending of the segment 28, the upper side of the interior surface 60 of the liner wall 58 along the channel 62 corresponding to the segment 28 substantially closes against the edge 44 of the opening 46 to inhibit the passage of air therethrough. The vacuum in the channel may also act to help pull the upper portion 80 of the wall 58 against the opening and thereby aid in the sealing relationship. The edge 44 of the opening 46 may be sharp. Thus, proper positioning of the short milk tube 26 over the nipple 42 is important to both have an effective hanging relationship of the teat cup assembly from the nipple 42 to promote sealing of the nipple opening 46, while resisting cuts and maintaining a good seal of the nipple-receiving end around the nipple. In warmer environments where the liner is more flexible as a result of the increased temperature, it may be possible to move the nipple-receiving end farther down on the nipple 42, thereby increasing the likelihood that the edge of the nipple 42 will engage the liner wall 58 opposite a lug 76.

However, in colder climates or in the case of lighter weight teat cups, it may not be possible to move the nipple-receiving end all the way down over the nipple 42 and still have the desired bending at the segment 28. In this instance, an increase in flexibility in the segment may be achieved by having less of the nipple-receiving end 30 positioned over the nipple, thereby increasing the moment arm of the teat cup to achieve a more pronounced hanging. However, the lugs 76 may nonetheless engage the edge of the nipple 42 opening 46 as shown, for example, in FIG. 10.

The longitudinal grooves 74 aid in providing flexibility of the liner to hang in the proper relationship by increasing the flexibility of the segment in combination with the circumferential grooves 70. If circumferential grooves only, for example, were provided, the ability of the segment 28 to bend at the lugs would be limited. However, the longitudinal grooves 74 permit the lugs to be separated circumferentially and to move together along the top surface on the outside of the segment. FIGS. 7 and 8 demonstrate how the lugs 76 on the inside curvature 82 along the bottom side of the segment 28 when in a hanging orientation differ in spacing from those on the outside curvature 84 along the top side of the segment 28. The angled sides of the longitudinally extending grooves 74 permit the lugs 76 on the top surface of the outside of the segment 28 to move together as illustrated in FIG. 8, while those on the bottom side of the segment retain their spacing as shown in FIG. 7. This relative closure of the longitudinal grooves 74 on the outside curvature 84, i.e. the top surface of the exterior of the segment 28 when in the hanging, non-milking orientation, not only improves flexibility to permit restriction of airflow past the nipple opening 46, but also provides that the lugs 76 will be more continuous in a circumferential direction to protects the liner wall 58 from stressing that could promote cracks or cuts. On the other hand, the lugs 76 along the inside curvature 82, i.e. the bottom side of the segment, move together on opposite sides of the circumscribing grooves 70 as shown in FIG. 7, the lugs ultimately contacting one another if the bending becomes too great, thereby limiting the bending to avoid localized overstressing the rubber in the segment.

Thus, the liner hereof provides substantial benefits in comparison to conventional liners having outwardly extending longitudinally extending splines and those with circumscribing raised ribs in the short milk tube. The lugs hereof are progressively larger due to the increasing groove-to-groove spacing, which permits the degree of flexibility of the segment to be varied by simply changing the placement of the nipple-receiving end on the nipple 42, with the combination of the longitudinal grooves 74 and the circumscribing grooves 70 cooperating to provide flexure without permitting the segment to fully bend and thereby promote stress and cracking. Unlike in previous liners such as shown in the U.S. Pat. No. 5,493,995 patent, complete bending is not required for airflow reduction as shown by FIGS. 9 and 10, while the channel remains open during normal milking positioning as shown by FIGS. 5 and 6. Unlike the splines or circumscribing ribs of the prior art liners, the lugs on the top surface and those on the bottom side work cooperatively to permit bending to a proper degree because the grooves extend both longitudinally and circumferentially.

Although preferred forms of the invention have been described above, it is to be recognized that such disclosure is byway of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the doctrine of equivalents to determine and assess the reasonably fair scope of their invention as pertains to any apparatus not materially departing from but outside the literal scope of the invention as set out in the following claims.

What is claimed is:

1. A flexible teat cup liner of a resilient material adapted for mounting a teat cup and coupling to a milking claw, the liner including a wall having an exterior and defining a channel for the passage of fluid therethrough, the liner being configured for placement on an animal's teat during milking, the liner comprising:

a mouthpiece including a mouth adapted for receipt of an animal's teat therethrough;

a barrel extending longitudinally from the mouthpiece and being configured for receiving at least a part of the animal's teat therein; and a tube extending longitudinally from the barrel and having an end axially remote from the mouthpiece configured for coupling to the milking claw, said tube including a segment between the end and the barrel, said segment being positioned relatively more proximate the end than said barrel, said segment including a multiplicity of discrete, axially spaced circumscribing grooves in the wall wherein the axial spacing between one adjacent pair of said circumscribing grooves is greater than the axial spacing between another adjacent pair of said circumscribing grooves, wherein said circumscribing grooves define a plurality of lugs in said segment, said lugs extending circumferentially along the segment, and wherein said lugs are circumferentially discontinuous.

2. A flexible teat cup liner in accordance with claim 1, wherein said multiplicity of circumscribing grooves are substantially parallel.

3. A flexible teat cup liner in accordance with claim 1, wherein said circumscribing grooves are formed to present divergent opposing side surfaces in the portion of the segment defining the groove.

4. A flexible teat cup liner in accordance with claim 1, wherein the one pair of said circumscribing grooves in the segment having the greater axial spacing is more proximate the mouth than the another pair of said circumscribing grooves.

5. A flexible teat cup liner in accordance with claim 1, wherein said segment includes a plurality of longitudinally extending grooves which intersect with at least some of said multiplicity of circumscribing grooves to define said lugs.

6. A flexible teat cup liner in accordance with claim 5, wherein said lugs are located on the exterior of the wall and extend in a direction radially away from said channel, and wherein during bending of said tube in said segment to present an inside curvature and a diametrically opposed outside curvature along the exterior of said wall, a portion of at least one of the circumscribing grooves along the inside curvature at least partially closes whereby at least some of the lugs which are axially adjacent along the inside curvature move more proximate to one another and wherein at least a portion of one of the longitudinal grooves proximate the outside curvature at least partially closes whereby at least some of the lugs which are circumferentially adjacent along the outside curvature move more proximate to one another.

7. A flexible teat cup liner of a resilient material adapted for mounting a teat cup and coupling to a milking claw, the liner including a wall defining a channel for the passage of fluid therethrough, the liner being configured for placement on an animal's teat during milking, the liner comprising:

a mouthpiece including a mouth adapted for receipt of an animal's teat therethrough;

a barrel extending longitudinally from the mouthpiece and being configured for receiving at least a part of the animal's teat therein; and a tube extending longitudinally from the barrel and having a wall with an exterior and an end axially remote from the mouthpiece configured for coupling to the milking claw, said tube including a segment located between the barrel and the end, said segment including a plurality of discrete, axially spaced circumscribing grooves in the wall and a multiplicity of discrete, circumferentially spaced, longitudinally extending grooves in the wall, said circumscribing hooves and said longitudinally extending grooves intersecting to provide a multiplicity of discrete lugs in said segment, the wall of said liner having a greater thickness in said lugs than in the circumscribing grooves and the longitudinally extending grooves, at least one pair of adjacent ones of said circumscribing grooves in the segment having a greater axial spacing than another pair of adjacent ones of said circumscribing grooves.

8. A flexible teat cup liner in accordance with claim 7, wherein said multiplicity of longitudinal extending grooves are substantially parallel.

9. A flexible teat cup liner in accordance with claim 7, wherein said longitudinally extending grooves are formed to present divergent opposing side surfaces in the portion of the segment defining the longitudinally extending grooves.

10. A flexible teat cup liner in accordance with claim 7, wherein said circumscribing grooves are formed to present divergent opposing side surfaces in the portion of the segment defining the circumscribing grooves.

11. A flexible teat cup liner in accordance with claim 7, wherein said lugs are longitudinally aligned in rows along the segment.

12. A flexible teat cup liner in accordance with claim 11, wherein said lugs are longitudinally discontinuous.

13. A flexible teat cup liner in accordance with 7, wherein said lugs are located on the exterior of the wall and extend in a direction radially away from said channel, and wherein during bending of said tube in said segment to present an inside curvature and a diametrically opposed outside curvature along the exterior of said wall, a portion of at least one of the circumscribing grooves along the inside curvature at least partially closes whereby at least some of the lugs which axially adjacent along the inside curvature move more proximate to one another and wherein at least a portion of one of the longitudinal grooves proximate the outside curvature at least partially closes whereby at least some of the lugs which are circumferentially adjacent along the outside curvature move more proximate to one another.

14. A milking assembly comprising a claw having at least one nipple including an edge defining an opening, and a teat cup assembly mounted on said nipple in fluidic communication with said claw, said teat cup assembly comprising:

a teat cup having a first larger opening and a second, axially spaced smaller opening; and a teat cup liner mounted in said teat cup, the liner including a wall defining a channel for the passage of fluid therethrough, a mouthpiece mounted over the larger opening in the teat cup, a barrel positioned within the teat cup and adapted for receiving therein at least a portion of the teat of an animal, and a tube extending from the smaller opening and fluidically coupled to the claw, the tube including a nipple-receiving end mounted on said nipple, said tube including a segment adapted for engagement with the edge of said nipple, said segment including a plurality of discrete, axially spaced circumscribing grooves in the wall and a multiplicity of discrete, circumferentially spaced, longitudinally extending grooves in the wall, wherein the axial spacing between one adjacent pair of said circumscribing grooves is greater than the axial spacing between another adjacent pair of said circumscribing grooves, said circumscribing grooves and said longitudinally extending grooves intersecting to provide a multiplicity of discrete lugs in said segment, the wall of said liner having a greater thickness in said lugs than in the circumscribing grooves and the longitudinally extending grooves, whereby the tube is bendable to position the teat cup assembly in either a first, generally upright milking position with the mouth of the liner oriented upwardly for milking or a second, generally downwardly oriented non-milking position wherein the mouthpiece of the liner is oriented downwardly, the tube being mounted on the nipple whereby the segment engages the edge of the nipple and wherein the flexibility of the tube in the segment may be adjusted by the extent the tube overlaps the nipple.

* * * * *